(12) United States Patent
Wintner et al.

(10) Patent No.: US 7,036,476 B2
(45) Date of Patent: May 2, 2006

(54) INTERNAL COMBUSTION ENGINE

(75) Inventors: Ernst Wintner, Oberweiden (AT); George Reider, Vienna (AT); Herbert Kopecek, Vienna (AT)

(73) Assignee: GE Jenbacher GmbH & Co. oHG (AT)

( * ) Notice: Subject to any disclaimer, the term of this patent is extended or adjusted under 35 U.S.C. 154(b) by 28 days.

(21) Appl. No.: 10/698,806

(22) Filed: Oct. 31, 2003

(65) Prior Publication Data

US 2004/0168662 A1 Sep. 2, 2004

(30) Foreign Application Priority Data

Oct. 31, 2002 (AT) .................................... A 1645/2002

(51) Int. Cl.
*F02P 23/04* (2006.01)

(52) U.S. Cl. .................................. 123/143 B
(58) Field of Classification Search ............. 123/143 R, 123/143 B
See application file for complete search history.

(56) References Cited

U.S. PATENT DOCUMENTS

| | | | | |
|---|---|---|---|---|
| 4,416,226 A | * | 11/1983 | Nishida et al. ......... | 123/143 B |
| 5,756,924 A | * | 5/1998 | Early .................... | 102/201 |
| 5,983,871 A | * | 11/1999 | Gordon et al. ........... | 123/536 |
| 6,053,140 A | * | 4/2000 | Feichtinger et al. ..... | 123/143 B |
| 6,305,929 B1 | * | 10/2001 | Chung et al. ............ | 431/254 |
| 6,382,957 B1 | * | 5/2002 | Early et al. ............ | 431/1 |
| 6,413,077 B1 | * | 7/2002 | Early et al. ............ | 431/1 |
| 6,428,307 B1 | * | 8/2002 | Early et al. ............ | 431/1 |
| 6,514,069 B1 | * | 2/2003 | Early et al. ............ | 431/1 |
| 6,676,402 B1 | * | 1/2004 | Early et al. ............ | 431/1 |
| 6,796,278 B1 | * | 9/2004 | Ryan, III ............... | 123/143 B |
| 6,802,290 B1 | * | 10/2004 | Wintner et al. ......... | 123/143 B |
| 2003/0136366 A1 | * | 7/2003 | Herdin et al. .......... | 123/143 B |

FOREIGN PATENT DOCUMENTS

| | | |
|---|---|---|
| DE | AT 005 307 U1 | 5/2002 |
| JP | 58074875 A | 5/1983 |
| JP | 63173852 A | 7/1988 |
| JP | 05033755 A | 2/1993 |

* cited by examiner

*Primary Examiner*—Andrew M. Dolinar
*Assistant Examiner*—Arnold Castro
(74) *Attorney, Agent, or Firm*—Lorusso & Associates

(57) ABSTRACT

An internal combustion engine comprising at least one cylinder, in which combustion of a fuel-air mixture compressed in the cylinder by a piston is initiated by time-controlled external ignition, wherein there is provided at least one laser light source for time-controlled external ignition and the laser light is focussed in the combustion chamber (32) on to at least two real focal points (19). Use of a holographic optical element for focussing of the laser light.

30 Claims, 4 Drawing Sheets

INTERNAL COMBUSTION ENGINE

BACKGROUND

Figure 1:
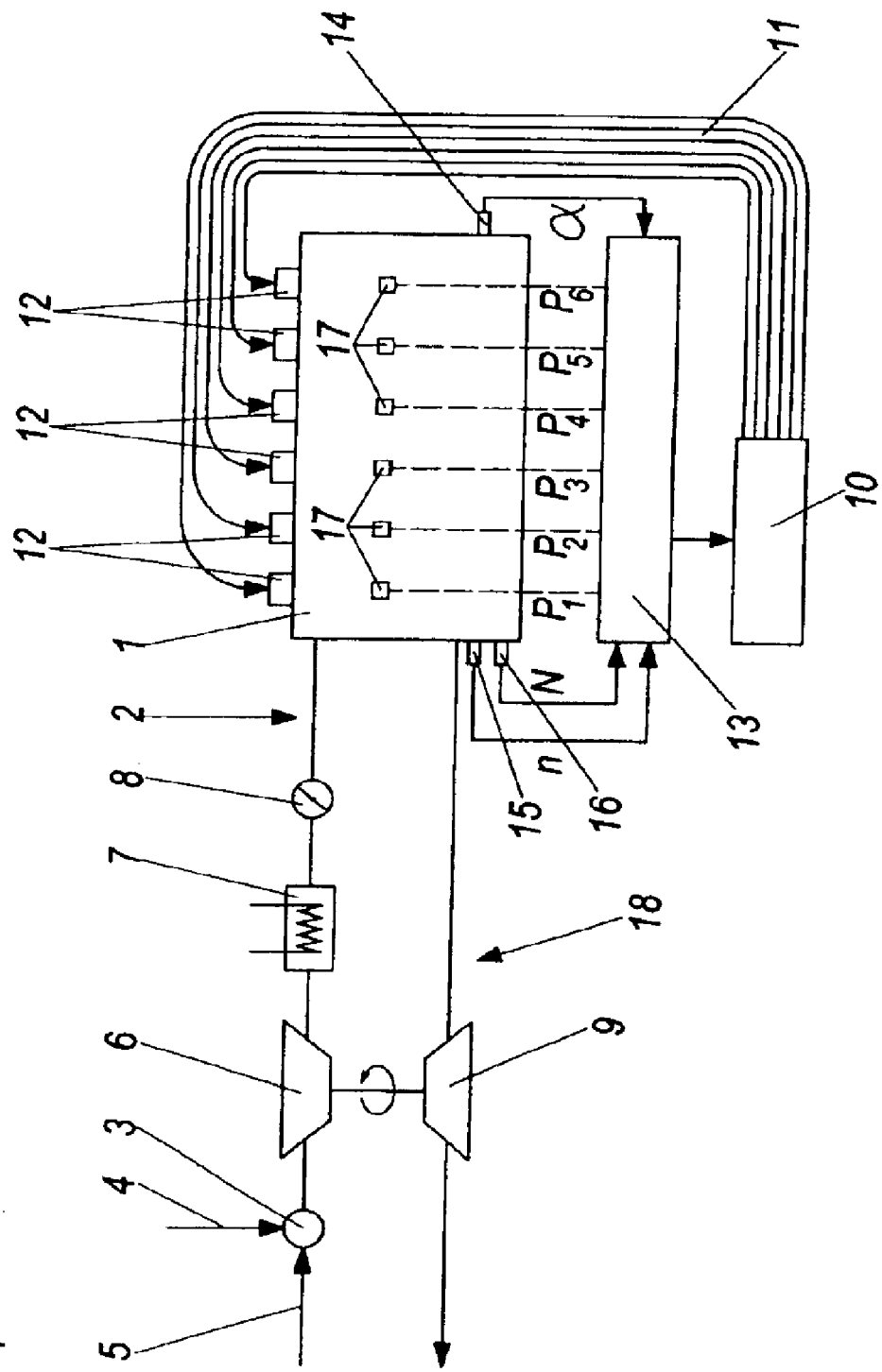

The present invention concerns an internal combustion engine comprising at least one cylinder and at least one laser light source for time-controlled externally supplied ignition.

Internal combustion engines of that kind are known in various different configurations. In the case of Otto cycle engines a homogeneous fuel-air mixture (a variation in the fuel-air ratio λ over the combustion chamber of less than 10%) is fired by way of an ignition system. That usually involves a spark plug or a laser light source, the use of laser light sources being advantageous for various reasons. For example when a laser light source is used adjustment of the electrode spacing which is necessary in the case of spark plugs after a given period of operation is no longer required. In addition with laser ignition, instead of spark ignition by way of spark plugs, it is also possible to reliably fire a very lean fuel-air mixture. Otto cycle engines can be for example in the form of a carburettor Otto cycle engine, an injection Otto cycle engine or a gas Otto cycle engine, wherein the latter is operated with a fuel which is gaseous in the normal condition.

In a further large group of internal combustion engines involving externally supplied ignition the fuel-air mixture in the combustion chamber is non-homogeneous. That is the case for example with an internal combustion engine with charge stratification in which a richer fuel-air mixture is provided around the ignition point, than in the rest of the combustion chamber. That results in an improvement in ignition certainty.

If combustion is initiated only at one point in the combustion chamber, the duration of the combustion process is dependent on the speed of propagation of the flame front in the combustion chamber. That also applies when using a laser light source for externally implemented ignition.

The presence of at least two and ideally a plurality of ignition points in the combustion chamber in comparison therewith has the advantage of enhanced ignition certainty and a reduction in the overall combustion duration. It is to be noted in that respect that these advantageous effects occur to their full extent only when there are a plurality of real focal points at which the light emanating from the laser light source is focussed on to finally many individual points. An internal combustion engine having a device for focussing a laser beam on to at least two different focal points is to be found for example in AT 5307 U1. In that case the laser beam from the laser light source is either reciprocated between two ignition locations by an electrically shiftable mirror or simultaneous focussing of the laser beam on to two different focal points is achieved by a convergent lens with a special grind.

JP 63173852 A discloses a combustion chamber in which a laser beam is shifted to and fro between two focal points by a rotating prism.

In JP 58074875 A the production of two simultaneous firing locations is implemented by the arrangement of two mirrors in the combustion chamber.

In comparison therewith, in a situation involving only partial focussing of the light (blurring of the light intensity on to a line-shaped region), as is provided for example in what is referred to as laser cavity ignition, that procedure involves a local intensity peak which is several orders of magnitude less than when there are a plurality of real focal points.

SUMMARY

The object of the invention is to avoid the expensive structures provided in the state of the art.

In accordance with the invention that is achieved in that there is provided at least one holographic optical element for focussing of the laser light.

The term holographic optical element is used to denote any diffractive optical device which has a distribution of diffractive amplitude or phase objects. The production of such a holographic optical element can be effected for example either directly by interferometry or by a computer-aided simulation (computer-generated holograms). The function of holographic optical elements is based on the fact that an optical wave field of given wavelength is completely determined in its further propagation if it is known in respect of amplitude and phase in any plane. Therefore, a wave with a known wave front (for example a laser beam) can be transformed into a desired wave by transmitting it through a two-dimensional optical element which at any point in its plane converts the phase and amplitude of the incident light field by absorption or phase delay to the desired field.

That represents a simple possible way of focussing the laser light in the combustion chamber on to at least two real focal points.

Preferably in that respect the intensity of the laser light can be or is individually predetermined at any focal point. That can be achieved by a configuration, which is familiar to the man skilled in the art, of the holographic optical element or elements, for example diffraction gratings.

Preferably the light which is focussed on to at least two focal points originates from just one laser light source. That reduces the production costs of an internal combustion engine according to the invention.

Advantageously there is precisely one laser light source per cylinder. In that way a defective laser light source only results in the failure of only one cylinder of the internal combustion engine. In order further to reduce the production costs of an internal combustion engine according to the invention however it can also be provided that just one laser light source is used for the whole of the internal combustion engine.

Preferably, it is exclusively the phase of the laser light wave front that is influenced by the holographic optical element as absorptive holographic optical elements nullify a part of the incident laser power and in that case can be destroyed or damaged in view of the high laser intensities.

A procedure which presents itself for the production of the holographic optical elements is lithography which nowadays makes it possible to produce structural sizes in the range of the wavelength of light and thus affords a large number of possible design options.

The local phase displacement of the wave front can be established for example by a defined local thickness configuration in respect of the holographic optical element, preferably a plate. In that respect glass or sapphire presents itself as the carrier material, into which the desired changes are impressed for example by an etching operation. Alternatively or additionally it is also possible to predetermine the phase displacement by a defined local variation in refractive index.

Preferably the internal combustion engine according to the invention has at least one optical transmission means which serves for transmission of the laser light from the laser light source to the combustion chamber or chambers. In that way the laser light source or sources can be arranged at any location in the internal combustion engine.

Preferably the internal combustion engine according to the invention also has at least one coupling-in optical system for coupling the laser light into at least one combustion chamber. In that way it is possible to reduce the light losses in the coupling-in process. When using an optical transmission means or coupling-in optical system it is possible for the holographic optical element to be integrated into one of those arrangements.

In order further to reduce the scatter losses it is also possible for a collimating optical system to be arranged in the beam path of the laser light upstream of the holographic optical element.

A simple example of a holographic optical element according to the invention is a diffraction grating which can be interpreted as a hologram of an object point at infinity. That diffraction grating superposes on the incident light field a transversely periodically modulated phase delay so that the light field downstream of the grating is equivalent to a superposition of the incident field with a plurality of diffracted replicas of the original field. In that case the spatial structure of the field is substantially maintained. It is only the direction of propagation of the light that is altered in known manner in dependence on the modulation period of the grating. If the normal direction relative to the plane of the grating is selected as the direction of propagation of the incident field, the directions of propagation of the diffracted and transmitted new fields respectively are disposed in known manner in a plane which is perpendicular to the grating lines. By means of a linear combination or two or more gratings involving differing orientations and/or periodicities in a single holographic optical element, it is possible to implement a corresponding linear combination of the diffracted fields in a manner with which the man skilled in the art is familiar. It will be appreciated that there is no need for the incident field to have an approximately flat wave front. If for example focussing of the laser beam takes place prior to passing through the holographic optical element, preferably through a lens, all resulting modified beams are also focussed, wherein the individual focal points are in the focal plane of the focussing lens. Those focal points are in a plane which is perpendicular to the grating lines and in which the focal point of the incident beam is also located. Simultaneous focussing of all partial beams however can also be effected through a lens which is disposed in the beam path immediately downstream of the holographic optical element.

It is to be noted that the function of the focussing optical element can also be taken over by the holographic optical element itself. For example a radial grating with outwardly decreasing line spacings (Fresnel zone system) is the hologram of an object point which is at finity. By superpositioning of grating structures in a single holographic optical element it is possible to achieve the simultaneous effect of beam splitting and focussing.

The provision of a plurality of focal planes, that is to say three-dimensional distribution of focal points or in other words, the production of focal points involving differing focal lengths, can also be implemented by a configuration, which is familiar to the man skilled in the art, of the holographic optical element, for example by the superpositioning of different focussing structures in the holographic optical element.

In an advantageous embodiment of the invention there is provided an electronic engine management system which in dependence on detected engine parameters such as for example the crankshaft angle, speed of rotation, engine output and the current cylinder pressure in the combustion chamber, actuates the laser light source or sources and in so doing establishes laser light parameters such as the time sequence, pulse duration and/or firing energy.

In a further advantageous embodiment of the invention it is provided that the fuel-air mixture is fired per working cycle of an engine by at least two laser light pulses which occur in succession in respect of time. As the first laser pulse produces a disassociation of the fuel proportions into components which can be more easily ignited by the second laser pulse, that makes it possible to achieve an improvement in the ignition properties.

In the situation involving active detection of the cylinder pressure in each cylinder by a regulating device, it is also possible, with that double or multiple ignition, to implement direct intensity regulation as, by reference to the cylinder pressure, it is easy to establish whether ignition has already been triggered by the first laser pulse. If the first laser pulse has not resulted in ignition, which is reflected in a lower rise in cylinder pressure, the engine management system or the regulating means provided therein can increase the second laser pulse in respect of its intensity and/or duration in order nonetheless to achieve certain ignition in that working cycle.

In a further advantageous embodiment of the invention it is provided that the air-fuel ratio of the fuel-air mixture in the combustion chamber is greater than 1.9. That very lean mode of operation of an internal combustion engine according to the invention is also distinguished for example by emission values (in particular of $NO_x$), besides affording a low fuel consumption.

BRIEF DESCRIPTIONS OF THE DRAWINGS

Figure 2:
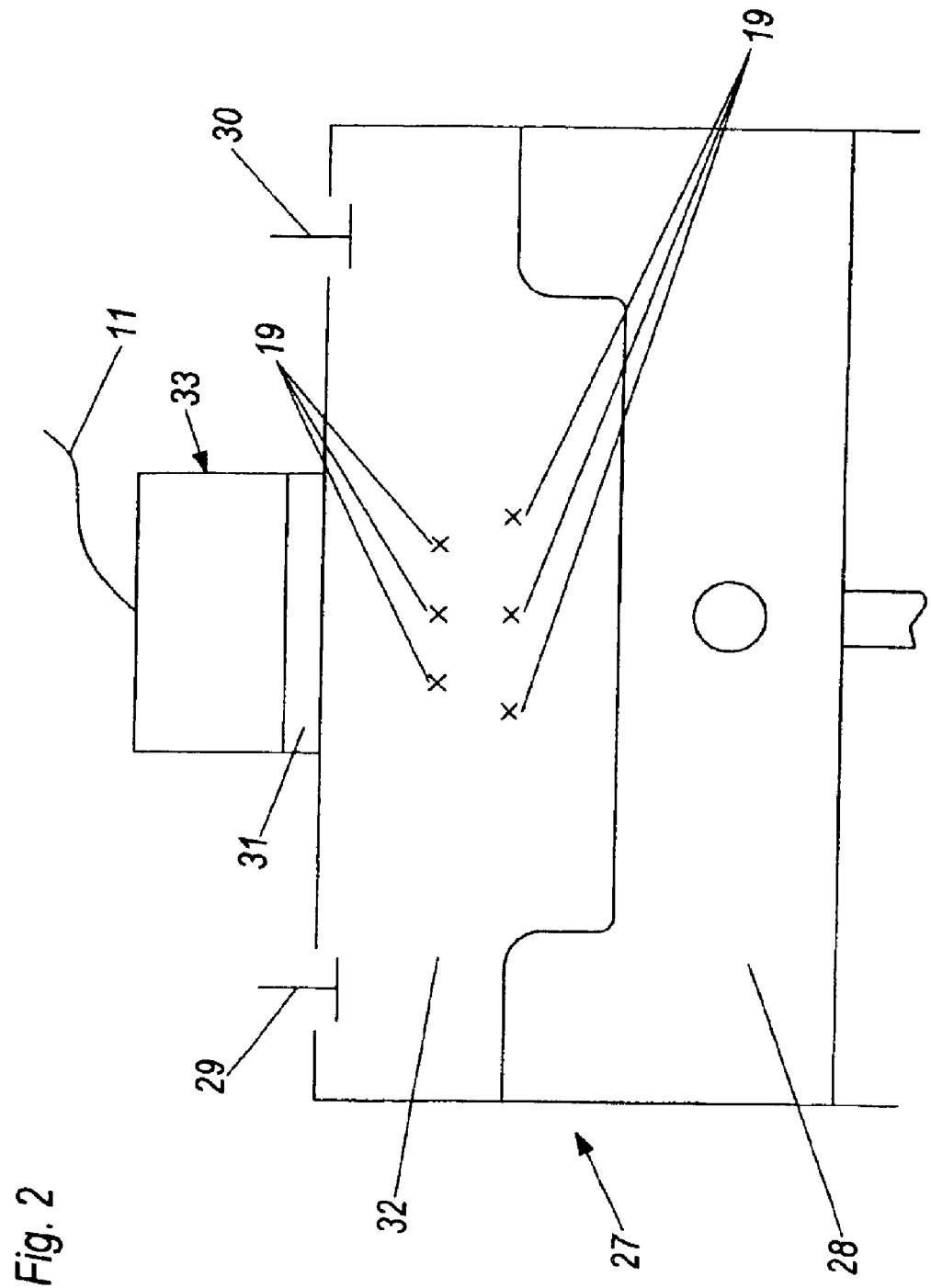
Figure 3:
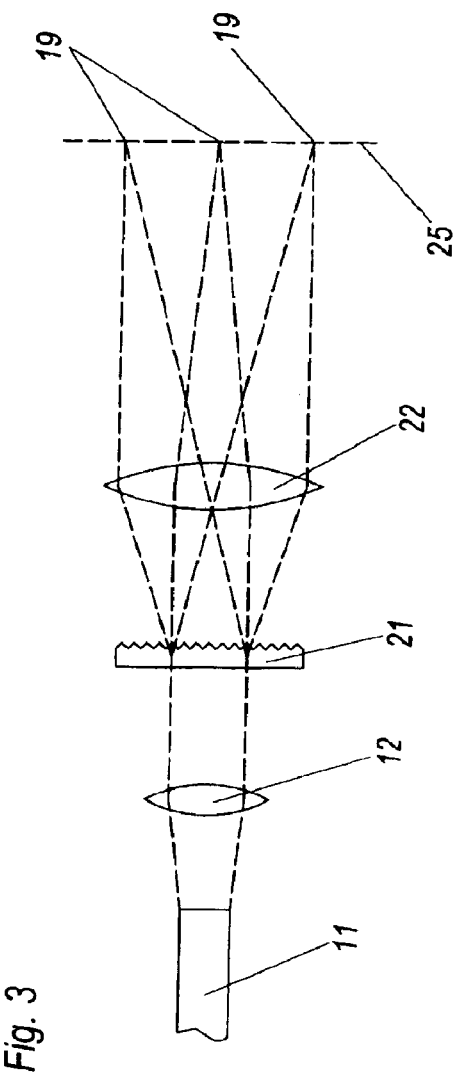
Figure 4:
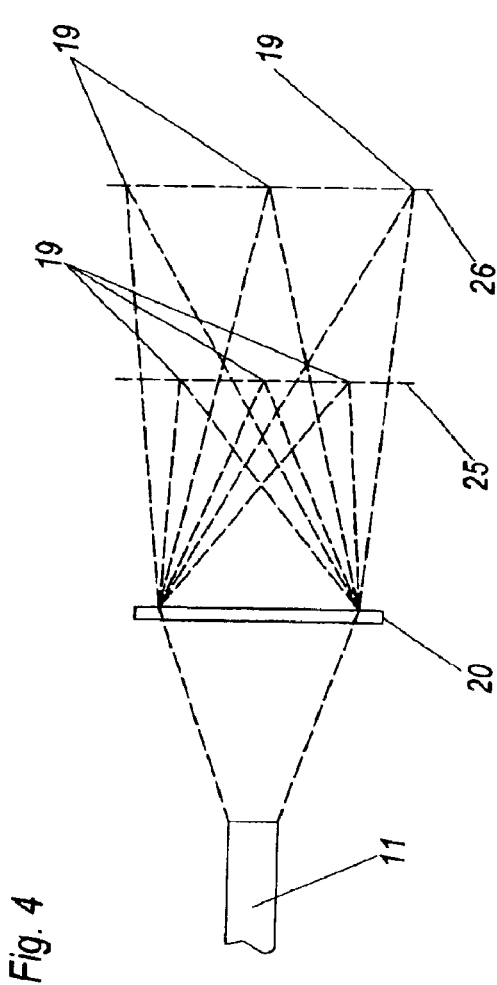
Figure 5:
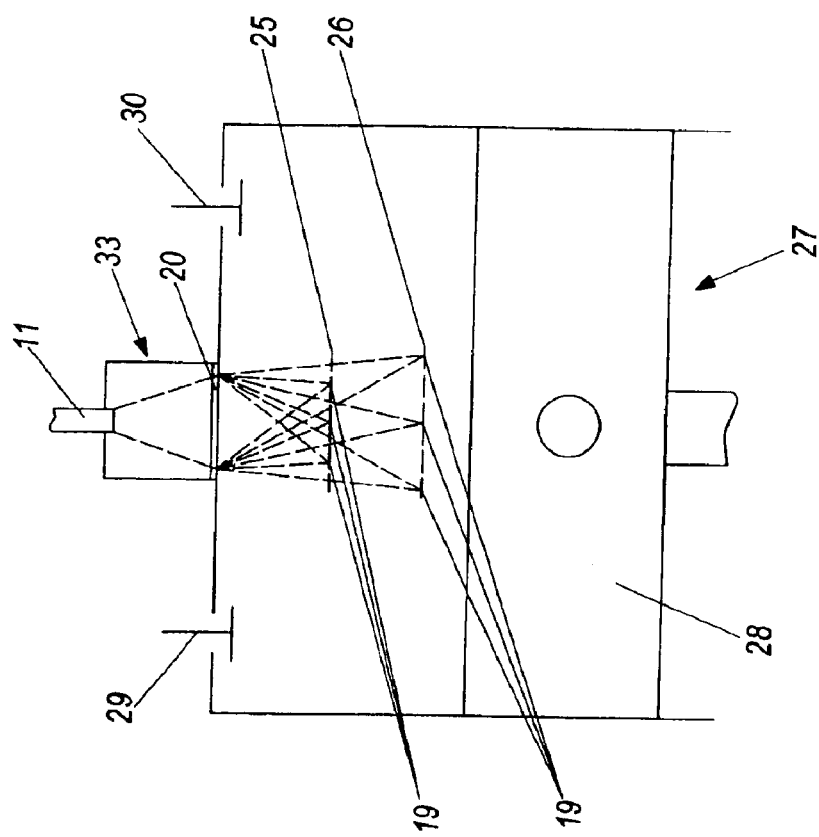
Figure 6:
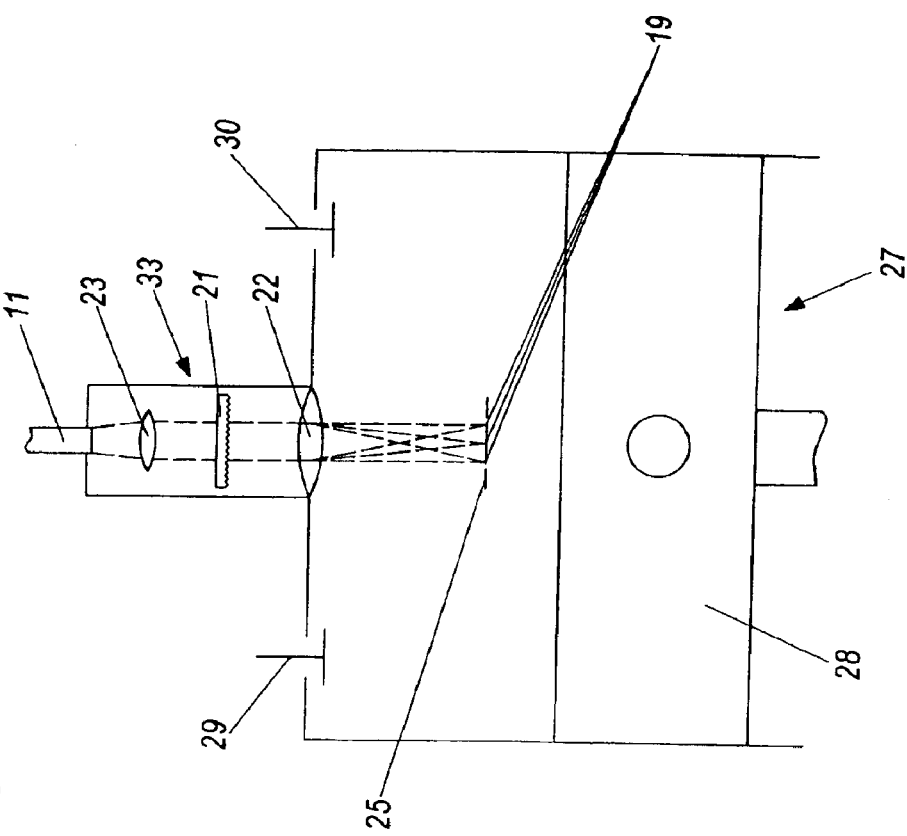

Further advantages and details of the invention are described in greater detail with reference to the specific description hereinafter. In the drawing:

FIG. 1 is a diagrammatic view of an embodiment of an internal combustion engine according to the invention, FIG. 2 shows a diagrammatic view in longitudinal section of a variant of a cylinder of an internal combustion engine according to the invention, FIG. 3 is a diagrammatic view in detail showing the structure of an optical ignition arrangement in an internal combustion engine according to the invention, FIG. 4 shows a further variant of an optical ignition arrangement in an internal combustion engine according to the invention, FIG. 5 is a diagrammatic view in longitudinal section of a variant of a cylinder of an internal combustion engine according to the invention with an optical ignition arrangement as shown in FIG. 3, and FIG. 6 is a diagrammatic view in longitudinal section of a further variant of a cylinder of an internal combustion engine according to the invention with an optical ignition arrangement as shown in FIG. 4.

DETAILED DESCRIPTION

The internal combustion engine 1 shown by way of example in FIG. 1 is a six-cylinder stationary gas Otto cycle engine with an induction tract 2 and an exhaust tract 18. In a gas mixer 3 gas, for example methane, which is supplied by way of the conduit 4, is mixed with air supplied by way of the conduit 5. Instead of a conventional gas mixer gas can also be injected into an air conduit. The fuel-air mixture is compressed by way of the turbocharger 6 and passes by way of the mixture cooler 7 and the throttle flap 8 into the space upstream of the inlet valves (not shown) of the engine 1. The turbine wheel 9 of the turbocharger is arranged in the exhaust duct 18. It is also possible to see herein the coupling-in optical systems 12 which lead to the individual cylinders and which are in communication with a laser light source 10 by way of optical waveguides 11. The values for the current cylinder pressure per cylinder are detected by way of pick-ups 17 and passed to an electronic engine management system 13. The crankshaft angle α is transmitted to the engine management system 13 by way of an angle sender 14. By way of the diagrammatically illustrated pick-ups or measuring devices 15 and 16 respectively the current values corresponding to the engine output N and the rotary speed n respectively are passed to the engine management system 13.

FIG. 2 is a diagrammatic view in longitudinal section of a cylinder 27, in which, besides the piston 28, it is possible to see the inlet valve 29 as well as the exhaust valve 30 and the ignition optical system 33 which is associated with the ignition arrangement and which is disposed at a combustion chamber window 31. The laser light is passed by way of an optical waveguide 11 into the ignition optical system 33 and, as will be described in greater detail hereinafter, focussed in the combustion chamber 32 on to a plurality of real focal points 19. In this embodiment the piston 28 has a recess in its head.

FIG. 3 shows by way of example and in detail the structure of an optical ignition arrangement in the case of an internal combustion engine 1 according to the invention. From left to right FIG. 3 shows the optical waveguide 11, a lens 12 which represents the coupling-in optical system for the diffraction grating 21, a further lens 22 and, indicated in broken line, a focal plane 25 in which three real focal points 19 are located. Preferably the light which issues from the optical waveguide 11 with a certain spread angle is converted by a lens 12 into a beam which is incident in parallel relationship on the diffraction grating 21. The light which is diffracted by the diffraction grating 21 into the primary maximum and the two secondary maxima of the first order is focussed by a further lens 22 and focussed in accordance with the focal length of that lens in the focal plane 25.

FIG. 4 shows a further embodiment of an optical ignition arrangement according to the invention, comprising a single holographic optical element 20. In this embodiment the holographic optical element 20 takes over both the part of the collimating optical system 12 and also the function of the lens 22 in FIG. 3. As diagrammatically illustrated, in this case focussing of the transmitted light is effected on to two focal planes 25 and 26 which are spatially spaced from each other. That produces a three-dimensional distribution of the individual focal points 19, in which respect moreover it is also possible to predetermine the intensity of the individual focal points 19, thereby affording a hitherto unattained manipulation capability in regard to the nature of the combustion process in the combustion chamber.

FIGS. 5 and 6 each diagrammatically show a cylinder 27 of an internal combustion engine 1 according to the invention, the differences lying in the configuration of the optical ignition arrangement 33. The structure shown in FIG. 5 used an optical system 33 as shown in FIG. 3 whereas the optical system 33 in FIG. 6 is designed in the manner shown in FIG. 4. It will be seen from FIG. 6 that the integration of all optical functions in the holographic optical element 20 makes it possible to achieve an extremely compact optical system 33.

The internal combustion engine 1 according to the invention is equally suitable for stationary and also for mobile uses.

Features which are familiar to the man skilled in the art have not been described and illustrated herein.

What is claimed is:

1. An internal combustion engine comprising at least one cylinder and at least one laser light source for time-controlled externally supplied ignition, wherein there is provided at least one holographic optical element for focusing of the laser light.

2. An internal combustion engine according to claim 1 wherein the laser light is focused in the combustion chamber on to at least two real focal points.

3. An internal combustion engine according to claim 2 wherein the light focused on to the at least two focal points issues from just one laser light source.

4. An internal combustion engine according to claim 1 wherein there is provided just one laser light source per cylinder.

5. An internal combustion engine according to claim 1 wherein there is provided just one laser light source for the entire internal combustion engine.

6. An internal combustion engine according to claim 2 wherein the intensity of the laser light is or can be individually predetermined at each focal point.

7. An internal combustion engine according to claim 1 wherein exclusively the phase of the laser light wave front is influenced by the holographic optical element.

8. An internal combustion engine according to claim 1 wherein the holographic optical element is lithographically produced.

9. An internal combustion engine according to claim 1 wherein the holographic optical element includes a plate with a defined local variation in thickness.

10. An internal combustion engine according to claim 9 wherein the plate is made from a material selected from the group consisting of glass and sapphire.

11. An internal combustion engine according to claim 1 wherein the holographic optical element includes a plate with a defined local variation in refractive index.

12. An internal combustion engine according to claim 11 wherein the plate is made from a material selected from the group consisting of glass and sapphire.

13. An internal combustion engine according to claim 1 further comprising at least one optical transmission means.

14. An internal combustion engine according to claim 1 further comprising at least one coupling-in optical system for coupling the laser light into at least one combustion chamber.

15. An internal combustion engine according to claim 13 wherein the optical transmission means include at least one holographic optical element.

16. An internal combustion engine according to claim 14, wherein the coupling-in optical system includes at least one holographic optical element.

17. An internal combustion engine according to claim 1 wherein at least one collimating optical means is arranged in the beam path of the laser light upstream of the holographic optical element.

18. An internal combustion engine according to claim 1 wherein at least one focusing optical element is arranged in the beam path of the laser light upstream of the holographic optical element.

19. An internal combustion engine according to claim 1 wherein at least one focusing optical element is arranged in the beam path of the laser light downstream of the holographic optical element.

20. An internal combustion engine according to claim 1 wherein at least one focusing optical element is a lens.

21. An internal combustion engine according to claim 1 wherein the focal length (f) of at least two focal points is different.

22. An internal combustion engine according to claim 1 wherein the engine is selected from the group consisting of a carburetor Otto cycle engine, an injection Otto cycle engine and a gas Otto cycle engine, each operated with fuel which is gaseous in the normal condition.

23. An internal combustion engine according to claim 1 wherein the engine is a multi-cylinder engine.

24. An internal combustion engine according to claim 1 wherein the engine is a stationary engine.

25. An internal combustion engine according to claim 1 wherein the fuel-air mixture in the combustion chamber is homogeneous.

26. An internal combustion engine according to claim 1 wherein there is provided an electronic engine management system which, in dependence on detected engine parameters, actuates the laser light source or sources and in so doing establishes laser light parameters.

27. An internal combustion engine according to claim 26, wherein the detected engine parameters are selected from the group consisting of crankshaft angle ($\alpha$), rotary speed (n), engine output (N) and current cylinder pressure ($P_1$) in the combustion chamber.

28. An internal combustion engine according to claim 26 wherein the laser light parameters are selected from the group consisting of succession in respect of time, pulse duration and firing energy.

29. An internal combustion engine according to claim 1 wherein the fuel-air mixture is fired per working cycle of a cylinder by at least two laser light pulses which occur in succession in respect of time.

30. An internal combustion engine according to claim 1 wherein the air fuel ratio ($\lambda$) of the fuel-air mixture in the combustion chamber is greater than 1.9.

* * * * *